United States Patent
Meandzija

(12) 
(10) Patent No.: US 6,404,743 B1
(45) Date of Patent: *Jun. 11, 2002

(54) ENHANCED SIMPLE NETWORK MANAGEMENT PROTOCOL (SNMP) FOR NETWORK AND SYSTEMS MANAGEMENT

(75) Inventor: Branislav N. Meandzija, La Jolla, CA (US)

(73) Assignee: General Instrument Corporation, Horsham, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,605

(22) Filed: May 11, 1998

Related U.S. Application Data

(60) Provisional application No. 60/064,178, filed on Nov. 4, 1997.

(51) Int. Cl.[7] .............................................. H04L 12/28
(52) U.S. Cl. ........................ 370/254; 709/224; 709/242; 714/48; 345/736
(58) Field of Search ................................ 370/389, 400, 370/410, 224, 216, 241, 242, 249, 250, 254; 709/200, 201, 202, 203, 223, 224; 345/738, 736; 340/500, 502, 504, 506; 714/100, 1, 48

(56) References Cited

U.S. PATENT DOCUMENTS

| | | | | |
|---|---|---|---|---|
| 5,655,081 A | * | 8/1997 | Bonnell et al. | 709/202 |
| 5,696,486 A | * | 12/1997 | Poliquin et al. | 340/506 |
| 5,777,549 A | * | 7/1998 | Arrowsmith et al. | 340/506 |
| 5,889,470 A | * | 3/1999 | Kaycee et al. | 340/825.07 |
| 6,068,661 A | * | 5/2000 | Shari | 703/27 |

* cited by examiner

Primary Examiner—David R. Vincent
Assistant Examiner—Bob A. Phunkulh
(74) Attorney, Agent, or Firm—Barry R. Lipsitz; Douglas M. McAllister

(57) ABSTRACT

An enhanced Simple Network Management Protocol (SNMP) management system for telecommunications networks which efficiently provides many of the sophisticated management techniques enabled by Open Systems Interconnection (OSI), Common Management Information Protocol (CMIP) and Telecommunications Management Network (TMN) protocols, while maintaining the simplicity of SNMP. The enhanced SNMP defines a management state of each SNMP agent, define events which are to be reported from the agent to the management station, and provides a log for recording particular events and associated agent data vales when the events occur. The enhanced SNMP also provides the capability for an alarm, state change, and value change notification to be communicated from the SNMP agents to an SNMP management station when specific events occur at the agent.

60 Claims, 6 Drawing Sheets

STATE INFORMATION MODULE

ENHANCED SIMPLE NETWORK MANAGEMENT PROTOCOL (SNMP) FOR NETWORK AND SYSTEMS MANAGEMENT

This application claims the benefit of U.S. Provisional Application No. 60/064,178, filed Nov. 4, 1997.

File Name: GIC-514.appendix.doc

Size (KB): 145 KB

Date of Creation: Apr. 1, 2002

A CD-ROM entitled "Appendix for Enhanced Simple Network Management Protocol (SNMP) For Network and Systems Management" containing an Appendix entitled "Computer Code in ANSI.1 Language" is made a part hereof and is incorporated herein by reference. The CD-ROM contains the following file:

BACKGROUND OF THE INVENTION

The present invention relates to a method and apparatus for providing an enhanced Simple Network Management Protocol (SNMP) for network and systems management. The invention is suitable for use with communication networks, including LANs, WANs, and internets.

The following acronyms are used in this application:

SNMP Simple network management protocol
ASN Abstract Syntax Notation
CCITT International Telegraph And Telephone Consultative Committee (Translation)
CMIP Common Management Information Protocol
CMISE Common Management Information Service Elements
EFD Event Forwarding Discriminator
FDDI Fiber Distributed Data Interface
IETF Internet Engineering Task Force
IP Internet Protocol
ITU International Telecommunications Union
LAN Local Area Network
LD Log Discriminator
LMI Local Management Interface
MIB Management Information Base
NMF Network Management Forum
OSI Open Systems Interconnection
Q3 A TMN interface specification
RFC Request For Comment, published by the IETF
SMI Structure of Management Information
SNMP Simple Network Management Protocol
TCP Transaction Control Protocol
TMN Telecommunications Management Network
UDP User Datagram Protocol
WAN Wide Area Network Management of a system such as a communications network is concerned with supervising and controlling the system so that it fulfills the requirements of both the owners and users of the system. This includes the long-term planning required for the system to evolve to provide improved performance, and to incorporate new functionality or new technology. Management may also involve accounting to ensure that resources are fairly allocated to users, or to charge users for use of services. The management of a system may be performed by a combination of human and automated components. The term "manager" is used to refer to any entity, human or automated, that can perform management activities in a communications network or system. The manager encompasses a management station, and a human operator interface, discussed below.

As part of the online control of the system, one or more managers must perform the following activities:

Monitor the system to obtain up-to-date status information and to receive event reports from the agents;

Interpret the overall policy pertaining to the goals or requirements of the organization that owns the system to make decisions about what behavior is required from the system; and Perform control actions on the system resources to change their behavior and implement the management decisions.

As the number and variety of communications networks and services has grown, so has the diversity of management needs. In the past, these needs were satisfied by the manufacturer of the network equipment, or by network operator specific solutions. The resultant proliferation of incompatible management solutions has complicated the management of services and networks supported by different manufacturers' network equipment. It has also severely restricted the ability of network and service providers to exchange information in electronic form.

It has been realized that the communications industry would benefit from the existence of a consistent set of standards that would permit interoperability between a broad range of network equipment and management systems while allowing operators the freedom to adopt various implementation strategies. Network and service providers also have realized that they would benefit from the ability to exchange information electronically to provide services.

Standardization of management interactions provides obvious benefits of being able to manage multi-vendor components from a single management platform. Many different standards have been and are being introduced to cope with the complexities of network and distributed systems management. They include:

Internet Management Standards;
Telecommunications Management Network (TMN) Standards;
Open Systems Interconnection (OSI) Management Standards; and
Network Management Forum (NMF) Standards.

The most widely accepted management standard is the Internet SNMP set of standards, which was originally defined in the framework currently known as SNMPv1:

Structure and Identification of Management Information (SMI) for TCP/IP-based networks—RFC 1155 describes how managed objects contained in a Management Information Base (MIB) are defined; Management Information Base (MIB) for Network Management of TCP/IP-based Internets—RFC 1213 describes the managed objects contained in the MIB; and Simple Network Management Protocol (SNMP)—RFC 1157 defines the protocol used to manage the managed objects.

The model of network management that is used for SNMP consists of the following basic elements:

Management station,
Management agent;
Management information base; and
Network management protocol.

Managed objects are accessed via a virtual information store, termed the Management Information Base, or MIB. Objects in the MIB are defined using the subset of Abstract Syntax Notation One (ASN.1) defined in the SMI. In particular, each object type is named by an OBJECT IDENTIFIER, an administratively assigned name. The object type together with an object instance serves to uniquely identify a specific instantiation of the object. For human convenience, we often use a textual string, termed the "object descriptor", to refer to the object type.

Most computer and, communications equipment in the world today is SNMP manageable. SNMP is usually supported by the standard Internet User Datagram Protocol (UDP) and Internet Protocol (IP) over most existing communications environments such as serial links, Ethernet, FDDI, ATM, etc. A functionally richer version of SNMP, SNMPv2 has been introduced in 1993. The security and administration framework associated with SNMPv2 has not found wide acceptance and is currently in the process of being replaced in the SNMPv3 framework which consists of SNMPv1 and SNMPv2 and a new administrative and security framework.

The SNMP Network Management Framework presently consists of three major components. They are:

(1) the SNMPv2 SMI, described in RFC 1902—the mechanisms used for describing and naming objects for the purpose of management;

(2) the SNMPv1 MIB-II, described in RFC 1213—the core set of managed objects for the Internet suite of protocols; and (3) the protocol, SNMPv1 RFC 1157 and/or SNMPv2 RFC 1905—the protocol for accessing managed objects.

The Telecommunications-Management Network (TMN) standard was developed by the CCITT (ITU-T) to provide an architecture to achieve an interconnection between various types of management systems and telecommunications equipment for the exchange of management information over standardized interfaces. TMN is largely based on OSI management standards and includes:

Principles for TMN (ITU-T M.3010 and M.3020), which defines the architecture;

Generic Network Information model (ITU-T M.3100);

Management Services (ITU-T M.3200);

Management Function (ITU-T M.3400); and

Protocol Profiles for Management Interfaces (ITU-T Q.811, Q.812, Q.773).

It is intended that all networks, telecommunications services, and major type of equipment may be managed by TMN.

TMN functions exchange management information by means of the ITU-T X-700 (OSI system management) standards. Each software component in a TMN layer represents itself and the resources it manages to the layer above as a managed object. The interactions between manager and agent are defined by means of CMISE/CMIP. The organization of the information architecture, the MIB, contains managed objects for specific technologies that can be refined from the general template provided in ITU-T M-3100, the Generic Network Information Model.

All TMN communication is based on the Agent-Manager paradigm. The Q3 interface relies on the OSI management model using the OSI Common Management Information protocol. CMIP is used between Common Management Information Service Elements (CMISE) to provide Common Management Information Service (CMIS).

However, while SNMP-based management is commonly used because of its simplicity and resulting low cost of implementation, OSI CMIP and TMN because of their complexity are used only in very few systems restricted mostly to the telecommunications domain. To enable integration between the two types of systems the Network Management Forum (NMF) developed architectural solutions and translation schemes like "NMF Translation of ISO/CCITT GDMO MIBS to Internet MIBS". However all of these solutions have aimed at integration of the two types of systems and at a complete, literal translation. Because of the complexity of OSI, CMIP and TMN, this solution is not widely used and the sophisticated management techniques enabled by OSI, CMIP and TMN have not been used within SNMP management systems.

Accordingly, it would be desirable to provide an enhanced SNMP management system for telecommunications networks which efficiently provides many of the sophisticated management techniques enabled by OSI, CMIP and TMN, while maintaining the simplicity of SNMP.

The enhanced SNMP should define a management state of each SNMP agent, define events which are to be reported from the agent to an SNMP management station, and provide a log for recording particular events and associated agent data vales when the events occur. The enhanced SNMP should further provide the capability for an alarm, state change, and value change notification to be communicated from the SNMP agents to the SNMP management station when specific events occur at the agent.

The present invention provides a system having the above and other advantages.

SUMMARY OF THE INVENTION

The present invention relates to a method and apparatus for providing an enhanced Simple Network Management Protocol (SNMP) for network and systems management.

The present invention enables the use of the TMN X.700 techniques in SNMP management systems through a new mapping of the X.700 information model onto the SNMP information model. This mapping enables the use of the X.700 techniques in a way that is consistent with the SNMP management paradigm instead of attempting a complete, literal translation as the NMF has done.

A state information module, events module, and a log model are defined which enable X.700-style alarm and event surveillance, and event reporting.

A method is presented for providing an enhanced Simple Network Management Protocol (SNMP) for use by an SNMP management station in managing at least one SNMP agent in accordance with the present invention.

State information is defined at the management station designating the state of the agent, any of its components, or any resource represented by the agent, as a result of a communication with the agent, or as a future state to be imposed on the agent.

The method comprises the steps of: defining event information at the management station, and communicating the event information to the at least one agent via a network; storing the event information at the agent; the event information defining pre-conditions for generating an event; monitoring data associated with the agent to determine if the pre-conditions have been met, and, if so, generating the event at the agent; and communicating a notification regarding the event from the agent to the management station via the network.

The notification designates a particular available notification type that includes at least one of an alarm notification indicative of an alarm condition at the agent, a state change notification indicative of a change of a state of the agent, and a value change notification indicative of a change in a value of an object associated with the agent. For example, an alarm condition may exist at the agent if the value of an object associated with the agent is not in a predetermined acceptable range.

The method may include the further steps of defining administrative state information at the management station designating whether the agent, any of its components, or any resource represented by the agent has a locked or unlocked status, and communicating the administrative state information to the agent via the network.

The method may include the further steps of defining operational state information at the management station designating whether the agent, any of its components, or any resource represented by the agent has an enabled or disabled status; communicating the operational state information to the agent via the network and monitoring the enabled or disabled status at the agent to determine a change in the state of the agent, any of its components, or any resource represented by the agent.

The method may include the further steps of defining operational state information at the agent, any of its components, or any resource represented by the agent which designates an enabled or disabled status thereof and monitoring the enabled or disabled status at the agent to determine a change in the state of the agent, any of its components, or any resource represented by the agent.

The method may include the further steps of defining availability status information at the agent designating whether or not the agent, any of its components, or any resource represented by the agent is available; and monitoring the availability status at the agent to determine a change in the state of the agent, any of its components, or any resource represented by the agent.

The event information may define the available notification types (e.g., alarm, state change or value change).

The event information may. define event forwarding discriminator (EFD) information that defines EFD pre-conditions for the notification communicating step, in which case the method includes the further steps of: monitoring events that are generated by the agent to determine if the EFD pre-conditions have been met, and, if so, communicating the notification regarding the event from the agent to the management station via the network. For example, an event may be generated but may not be important enough to qualify to have a notification communicated to the management station immediately. The notification may therefore be communicated to the management station at a later time, or not at all. Or the notification may be communicated when a predetermined number of events occurs.

The EFD information may define a schedule for communicating the notification regarding the event from the agent to the management station via the network.

When the network is associated with a plurality of SNMP management stations, the EFD information defines particular ones of the plurality of SNMP management stations that are to receive the notification regarding the event.

When EFD information is defined, the method may include the further steps of defining administrative state information at the management station designating whether the EFD has a locked or unlocked status, and communicating the administrative state information to the agent via the network; and monitoring the locked or unlocked status at the agent to determine if the EFD pre-conditions have been met.

When EFD information is defined, the method may include the further steps of defining operational state information at the management station designating whether the EFD has an enabled or disabled status, and communicating the operational state information to the agent via the network; and monitoring the enabled or disabled status at the agent to determine if the EFD pre-conditions have been met.

When EFD information is defined, the method may include the further steps of defining operational state information of the EFD which designates an enabled or disabled status thereof; and monitoring the enabled or disabled status at the agent to determine if the EFD pre-conditions have been met. That is, a notification may not be provided for certain events if the agent is disabled.

When EFD information is defined, the method may include the further steps of defining availability status information at the agent designating whether or not the EFD is available; and monitoring the availability status information at the agent to determine if the EFD pre-conditions have been met. That is, the agent may have an automatic schedule which defines time periods in which a notification may be provided for certain events.

The method may include the further steps of defining log information at the management station, and communicating the log information to the agent via the network; storing the log information at the agent; the log information defining log pre-conditions for creating a log entry for the generated event; and monitoring data associated with the agent to determine if the log pre-conditions have been met, and, if so, creating the log entry for the generated event at the agent. The log is used by the agent to maintain a record of events.

When the log information defines log discriminator (LD) information that defines LD pre-conditions for creating the log entry for the generated event at the agent, the method may include the further steps of monitoring events that are generated by the agent to determine if the LD pre-conditions have been met, and, if so, creating the log entry for the generated event at the agent. That is, certain events may not qualify to be logged.

The LD information may define a schedule for creating the log entry for the generated event at the agent.

When LD information is defined, the method may include the further steps of defining administrative state information at the management station designating whether the LD has a locked or unlocked status, and communicating the administrative state information to the agent via the network; and monitoring the locked or unlocked status at the agent to determine if the log pre-conditions have been met. For example, certain events may not be logged if the agent is locked.

When LD information is defined, the method may include the further steps of defining operational state information of the LD which designates an enabled or disabled status thereof, and monitoring the enabled or disabled status at the agent to determine if the log pre-conditions have been met. For example, certain events may not be logged if the agent is disabled.

When LD information is defined, the method may include the further steps of defining availability status information at the agent designating whether or not the LD is available; and monitoring the availability status information at the agent to determine if the log pre-conditions have been met. That is, the agent may have an automatic schedule which defines time periods in which a log entry may be made for certain events.

When log information is defined, the method may include the further step of creating particular logs for the generated event according to the corresponding notification type to provide at least one of an alarm log entry, a state change log entry, and a value change log entry. For example, an event that has a particular notification type, such as an alarm, may be eligible to be entered into an alarm log.

When a log entry is provided, the method may include the further step of reading the log entry for the generated event to obtain the notification that is communicated from the agent to the management station. In this embodiment, communication of a notification and the entering of a log entry are dependent actions.

The method may include the further step of defining state information at the management station according to the notification that is communicated thereto from the agent; wherein the state information is adapted for use in managing the agent. For example, if the management station receives a notification of an alarm at an agent, the management station may communicate updated administrative state information to lock the agent, thereby effectively removing it from the network.

A corresponding apparatus is also presented for providing an enhanced Simple Network Management Protocol (SNMP) for use by an SNMP management station in managing at least one SNMP agent. The apparatus includes defining means, such as a processor and computer code stored in memory, and/or input from an operator interface, for defining event information at the management station; first communication means, such as a transceiver, for communicating the event information to the agent via a network; a memory, such as RAM, associated with the agent for storing the event information communicated thereto; the event information defining pre-conditions for generating an event; monitoring means, such as a micro-processor, associated with the agent for monitoring data associated therewith to determine if the pre-conditions have been met, and, if so, generating the event at the agent; and second communication means, such as a transceiver, associated with the agent for communicating a notification regarding the event to the management station via the network.

The notification designates a particular available notification type that includes at least one of an alarm notification indicative of an alarm condition at the agent, a state change notification indicative of a change of a state of the agent, and a value change notification indicative of a change in a value of an object associated with the agent.

The event information defines event forwarding discriminator (EFD) information that defines EFD pre-conditions for the second communication means; and the monitoring means-monitors events that are generated by the agent to determine if the EFD pre-conditions have been met, and, if so, the second communication means communicates the notification regarding the event to the management station via the network.

The EFD information may define a schedule for the second communication means to communicate the notification regarding the event from the agent to the management station via the network.

Optionally, the defining means defines administrative state information at the management station designating whether the agent, any of its components, or any resource represented by the agent has a locked or unlocked status; the first communication means communicates the administrative state information to the agent via the network; and the monitoring means monitors the locked or unlocked status at the agent to determine if the EFD pre-conditions have been met.

Optionally, the defining means defines operational state information at the agent, any of its components, or any resource represented by the agent which designates an enabled or disabled status thereof; and the monitoring means monitors the enabled or disabled status at the agent to determine if the EFD pre-conditions have been met.

Optionally, the defining means defines log information at the management station; the first communication means communicates the log information to the agent via the network; the memory stores the log information at the agent; the log information defines log pre-conditions for creating a log entry for the generated event; and the monitoring means monitors data associated with the agent to determine if the log pre-conditions have been met, and, if so, creates the log entry for the generated event at the agent.

When the defining means defines administrative state information at the management station designating whether the agent, any of its components, or any resource represented by the agent has a locked or unlocked status; the first communication means communicates the administrative state information to the agent via the network; and the monitoring means monitors the locked or unlocked status at the agent to determine if the log pre-conditions have been met.

Optionally, the defining means defines operational state information at the agent, any of its components, or any resource represented by the agent which designates an enabled or disabled status thereof; and the monitoring means monitors the enabled or disabled status at the agent to determine if the log pre-conditions have been met.

The defining means may define availability status information at the agent designating whether or not the agent, any of its components, or any resource represented by the agent is available; and the monitoring means may monitor the availability status information at the agent to determine if the log pre-conditions have been met.

The agent may include means for creating particular logs for the generated event according to the corresponding notification type to provide at least one of an alarm log entry, a state change log entry, and a value change log entry.

The agent may also include means for reading the log entry for the generated event to obtain the notification that is communicated from the second communication means to the management station.

The defining means may define state information at the management station according to the notification that is communicated thereto from the second communication means; and the state information may be adapted for use in managing the agent.

Optionally, the log information defines log discriminator (LD) information that defines LD pre-conditions for creating the log entry for the generated event at the agent; the monitoring means monitors events that are generated by the agent to determine if the LD preconditions have been met, and, if so, creates the log entry for the generated event at the agent.

DETAILED DESCRIPTION OF THE INVENTION

The present invention relates to a method and apparatus for providing an enhanced Simple Network Management Protocol (SNMP) for network and systems management. A state information module, events module, and a log model are defined which enable X.700 style alarm and event surveillance, and event reporting.

Figure 1:
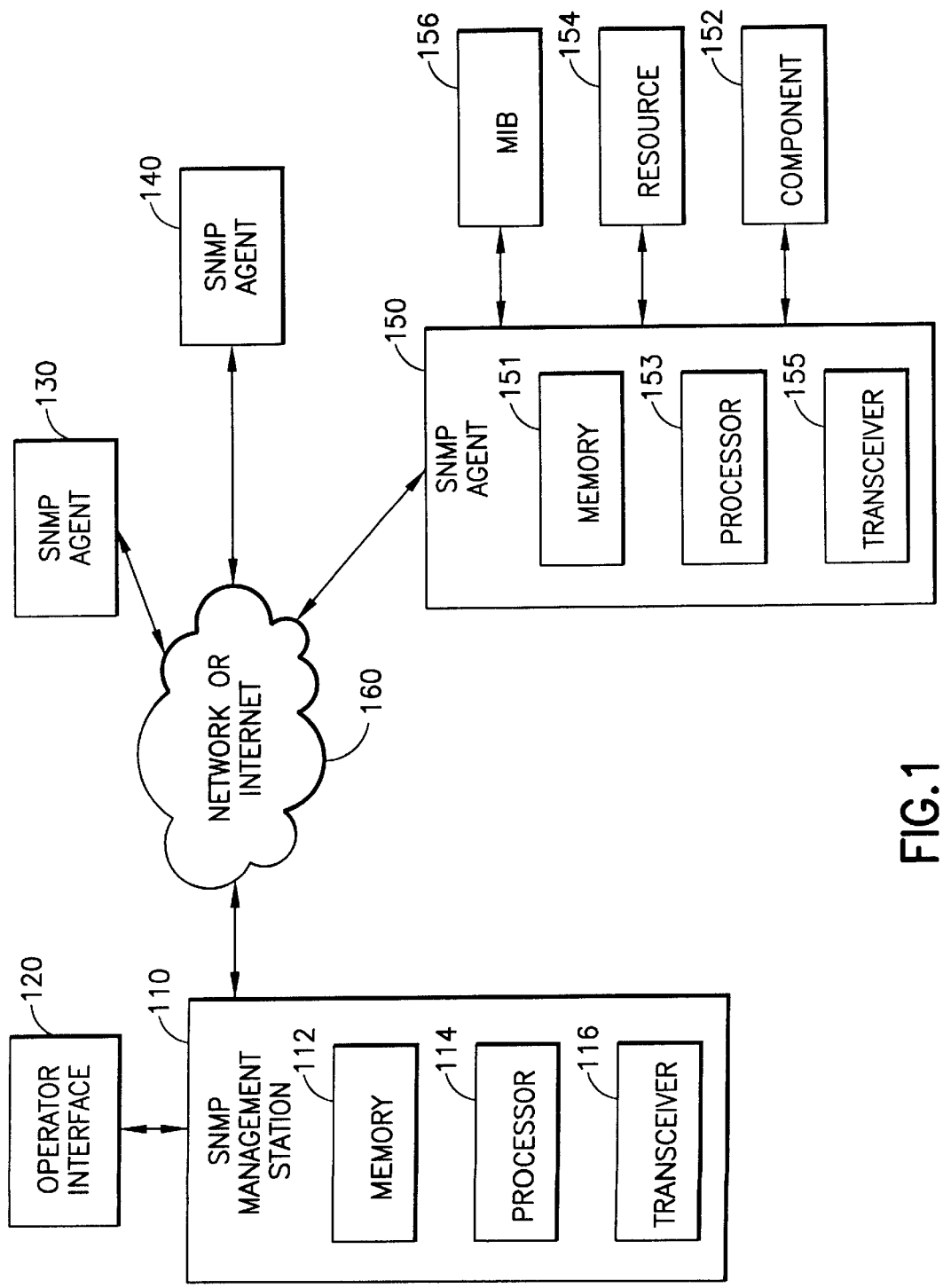
FIG. 1 illustrates a network with an SNMP management station and several SNMP agents in accordance with the present invention.

FIG. 1 illustrates a network with an SNMP management station and several SNMP agents in accordance with the present invention. An SNMP management station 110 may communicate with an operator interface 120, such as a keyboard, to receive information such as the administrative and operational states. The management station 110 has a memory 112, processor 114, and transceiver 116, and may be implemented as a workstation, personal computer or other type of computer or as a computer board or as a computer chip set. The memory 112 may comprise RAM, for example. The processor 114 may be a microprocessor. The transceiver 116, or transmitter/receiver is a conventional circuit such as a modem used for transmitting and receiving data.

A computer code to be used by the management processor set 110 is forth in the CD-ROM Appendix, and may be stored in the memory 112 and operated on by the processor 114. Information received from the operator interface 120 may also be stored in the memory 112.

The processor 114 may be used to execute the computer code to communicate information to specific agents, and to process information received from the agents.

The SNMP management station 110 communicates with a number of SNMP agents 130, 140 and 150 via a network or internet 160. Each agent, such as agent 150, may have a memory 151, processor 153, and transceiver 155, as well as one or more components, such as component 152, and may represent one or more resources, such as resource 154. The agent, e.g., agent 150, may also communicate with a MIB 156. The MIB may be provided as part of the general purpose memory 151.

Information, such as administrative state. information and event information may be communicated from the management station 110 to the agent 150 and stored in the memory 151. Event table data, EFD table data, and log control table data may be stored in the memory 151 for use by the agent 150. Alarm, state change, and value change log data may also be stored in the memory 151.

The processor 153 may be used to communicate information to, and receive information from, the management station 110, as well as for communicating with the MIB 156, resource 154, and component 152.

The management station 110 may be a standalone device (e.g., computer), or may be a capability implemented on a shared system. The station 110 serves as an interface for a human operator/manager into the management system and includes:

Management applications for data analysis, fault recovery, etc.;

A monitoring/control interface of the network for the manager;

The capability to translate a network manager's commands into actual monitoring and control of remote elements; and A database of information extracted from the MIBs of all the managed entities in the network.

The SNMP management agents 130, 140, 150 are embedded in key entities such as hosts, bridges, routers, and hubs, and respond to requests for actions from the management station 110. The management agents may also synchronously provide the management station 110 with important unsolicited information. Each agent supports access to a collection of managed resources, which are represented by managed objects referred to as the MIB 156. Managed objects are standardized across systems of a particular class; for example, all routers support a standard set of objects, in addition to some objects that are specific to a particular manufacturer's router model.

The management station 110 performs a monitoring function by retrieving the value of MIB objects from the agents. A management station can cause an action to take place at an agent or change the configuration settings of an agent by modifying the value of specific variables. The management station and agent are linked by the Simple Network Management Protocol, which supports three key operations:

Get—enables the management station to get the value of object variables at the agent;

Set—enables the management station to set the value of object variables at the agent; and Trap—enables an agent to asynchronously notify the management station of events.

There are no specific guidelines in the SNMP standards as to the number of management stations and the ratio of management stations per agent. In general, it is prudent to have at least two systems capable of performing the management station function to provide redundancy in case of failure. The number of management agents per station depends on the MIBs and particular environments but can be in the thousands.

Figure 2:
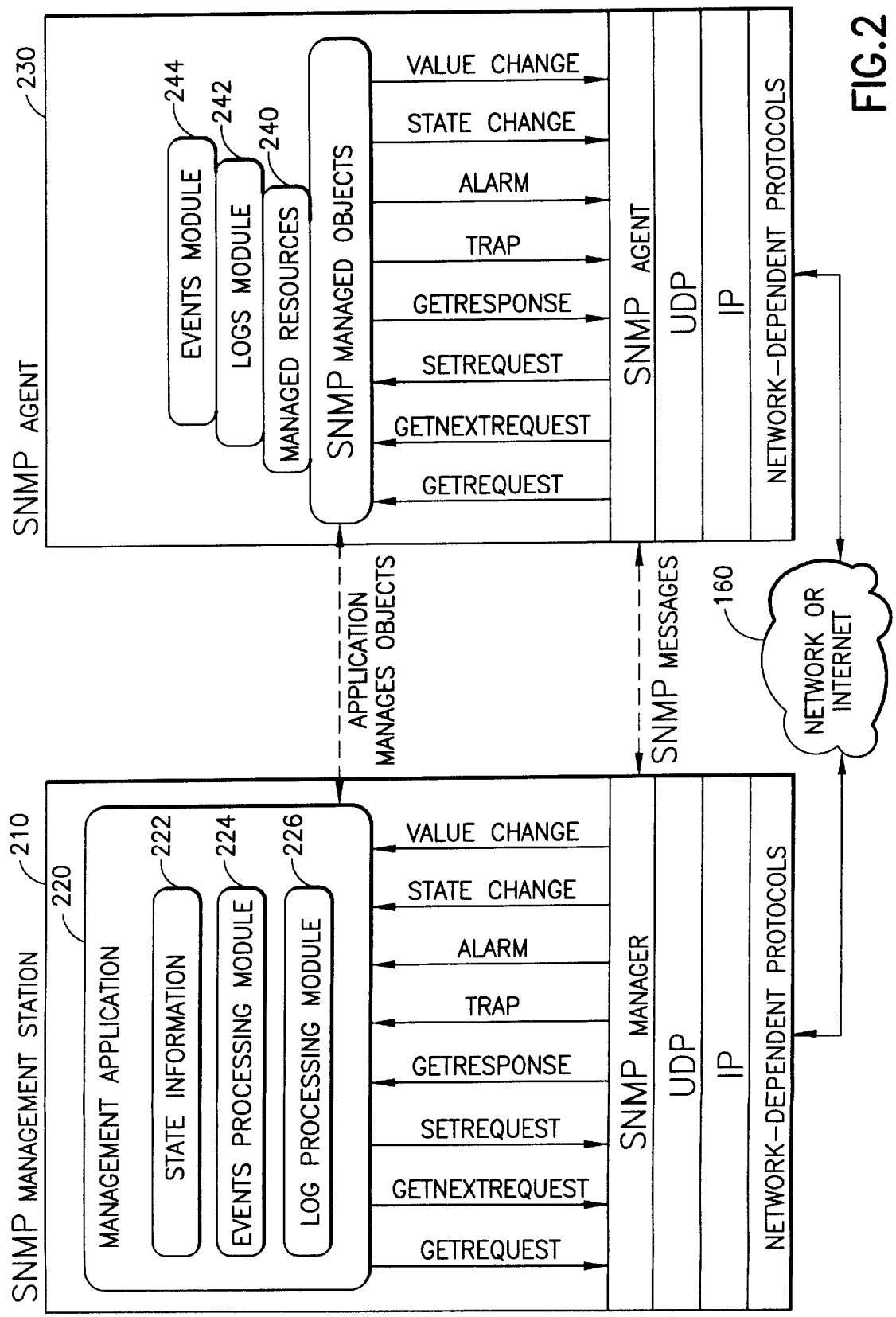
FIG. 2 illustrates an SNMP protocol in accordance with the present invention.

FIG. 2 illustrates an SNMP protocol in accordance with the present invention. At a management station 210, three types of messages are issued on behalf of a management application 220, namely: GetRequest, GetNextRequest, and SetRequest. The first two are variations of the Get function. All three messages are acknowledged by the agent 230 in the form of a GetResponse message. This message is passed up to the management application 220. Also, the agent 230 may issue a trap message in response to an event that affects the MIB and the underlying managed resources 240.

Furthermore, in accordance with the present invention, the SNMP agent 230 may issue an alarm, state change, and value change to the management station 210 in response to an event that affects the MIB and a logs module 242 or events module 244.

SNMP is a connectionless protocol since it relies on UDP, which is also a connectionless protocol. That is, no ongoing connections are maintained between the management station 210 and the agent 230. Instead, each exchange is a separate transaction between the management station 210 and the agent 230.

The management application 220 includes state information 222, an events processing module 224, and a log processing module 226. The events processing module 224 is used to provide event information that is communicated to the agent to define pre-conditions for the agent to generate an event. The event information also defines EFD information that defines pre-conditions for communicating a notification of an event from the agent 230 to the management station 210 via the network 160. The EFD information may also define a schedule which the agent is to follow in communicating the notification. In this manner, the management station 210 can process the incoming notifications in an orderly manner.

The log processing module 226 is used to provide log information that is communicated to the agent to define pre-conditions for the agent to create a log entry for an event. The log information also defines log discriminator (LD) information that defines pre-conditions for creating the log entry for an event. The LD information may also define a schedule which the agent is to follow in communicating the notification. In this manner, the logging of events can be organized according to criteria set by the management station 210.

Figure 3:
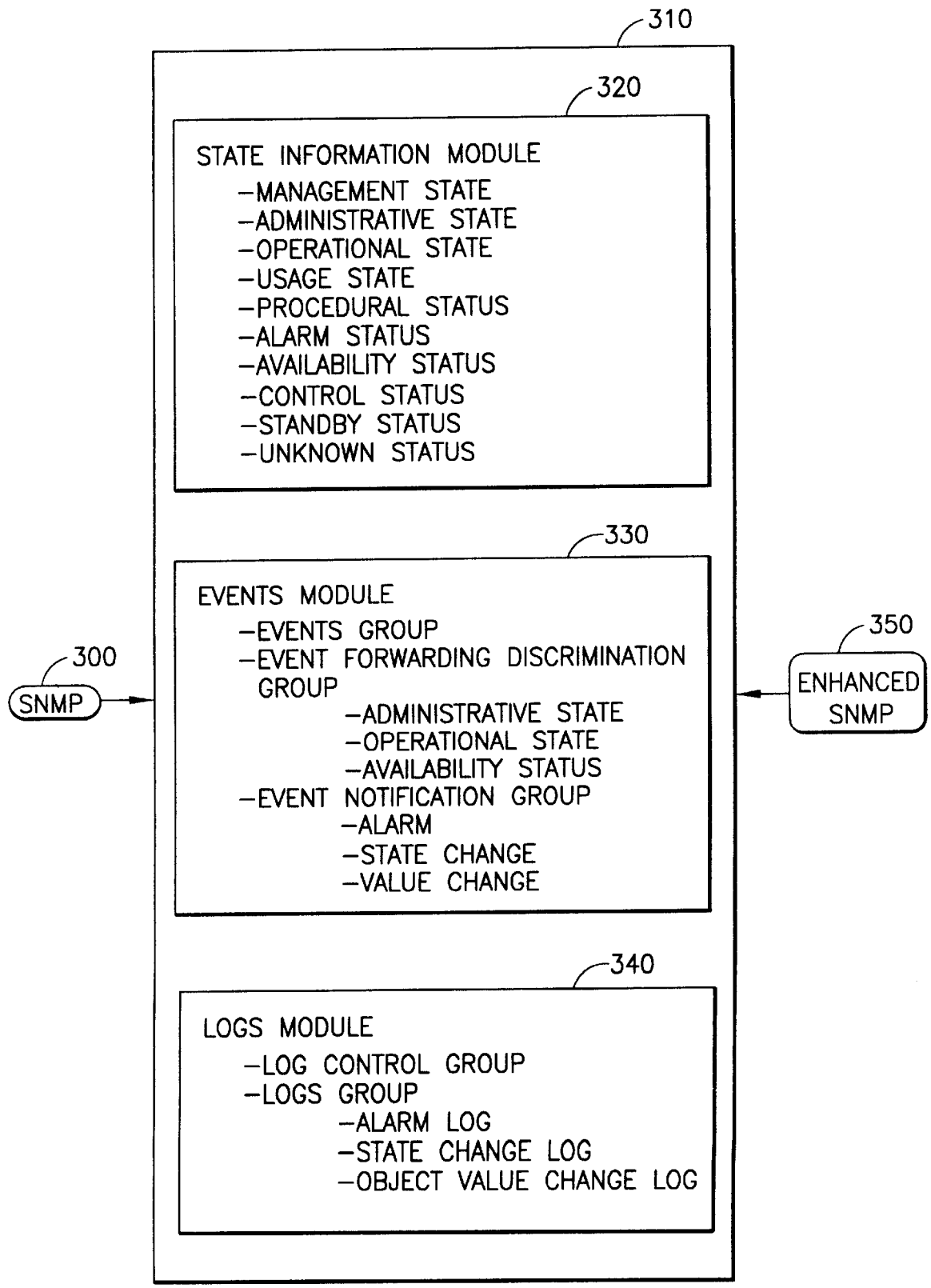
FIG. 3 illustrates a state information module, events module, and logs module for an enhanced SNMP protocol in,accordance with the present invention.

FIG. 3 illustrates a state information module, events module, and logs module for an enhanced SNMP protocol in accordance with the present invention. Conceptually, the use of the modules 310 with conventional SNMP 300 yields the enhanced SNMP 350 of the present invention. The modules 310 include a state information module 320, an events module 330, and a logs module 340.

The state information module 320 serves three purposes:
(1) Providing a way of representing the management state of agents across a network or internet, thereby minimizing redundancy of redeveloping information modules and maximizing design and implementation productivity and product quality;
(2) Providing a foundation for adopting the TMN Information Model in Element Managers. The state information module is based on the ITU-T X.731 standard which is part of the Q3 standard adopted by TMN; and
(3) Enabling (1) and (2) for modules, groups of objects, or rows in a table by using the same value sets.

The state information module 320 includes a number of states and status functions, including a management state, an administrative state, an operational state, a usage state, a procedural status, an alarm status, an availability status, a control status, a standby status, and an unknown status. These items are discussed in greater detail in connection with FIG. 4.

The events module 330 includes a number of items, including an events group, an event forwarding discrimination (EFD) group, which includes an administrative state, an operational state, and an availability status, and an event notification group, which includes an alarm, state change, and a value change. These items are discussed in greater detail in connection with FIG. 5.

The logs module 340 includes a log control group, and a logs group, which includes an alarm log, a state change log, and an object value change log. These items are discussed in greater detail in connection with FIG. 6.

Figure 4:
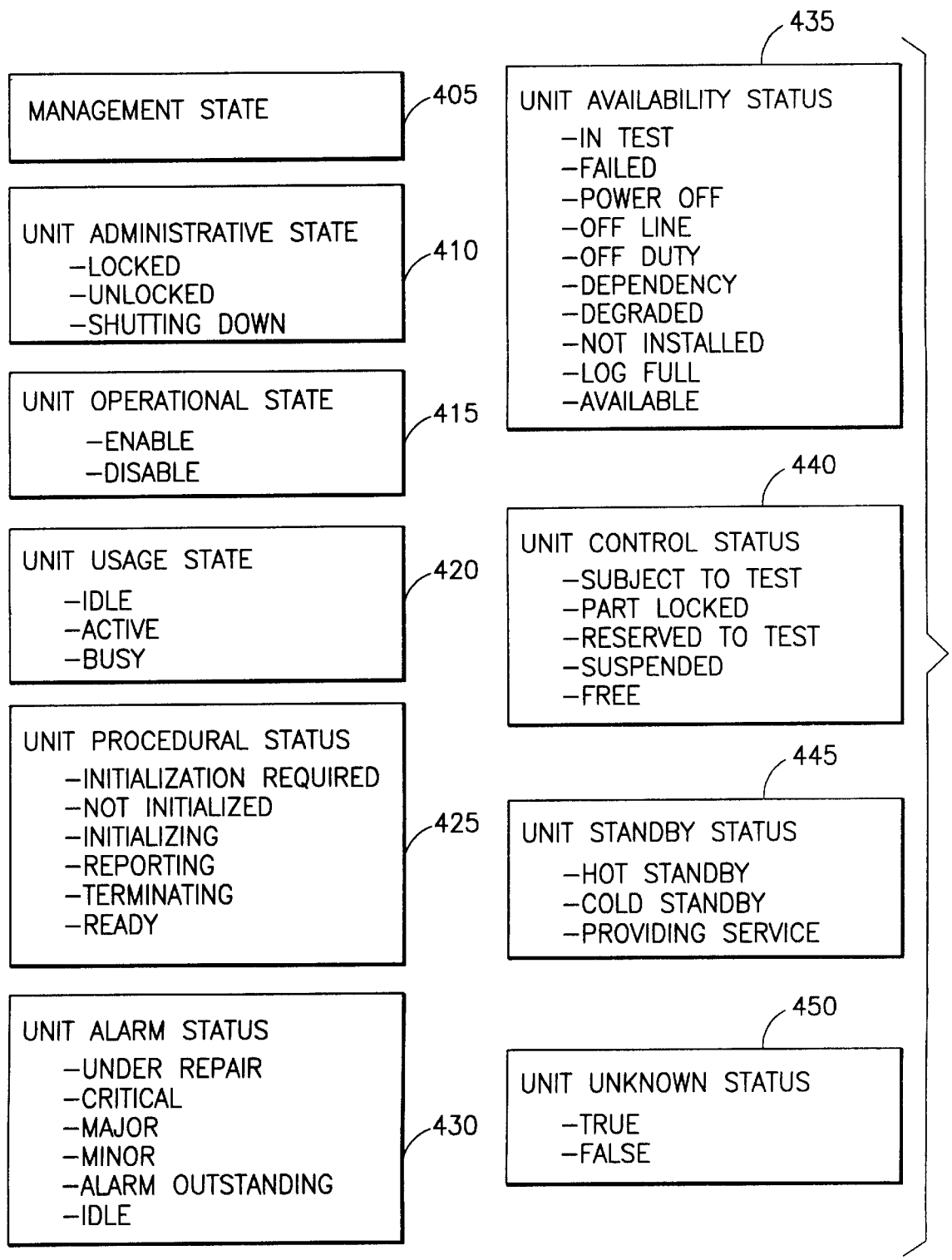
FIG. 4 illustrates a state information module in accordance with the present invention.

FIG. 4 illustrates a state information module in accordance with the present invention. The management state 405 represents the instantaneous condition of availability and operability of the associated agent resource from the point of view of management. A variety of state attributes can be used that express and control aspects of the operation of the agent's resources that are specific to each agent. However, the management state is expected to be common to a large number of resources and, for this reason, should be uniform. The management state expresses key aspects of the resource's usefulness at any given time. The purpose of the management state is to control the general availability of a resource and to make visible information about that general availability.

The agent's resources may be actual hardware or software which is being represented by the agent to the manager through the management information.

The administrative state 410, which is designated by the object "unitAdministrativeState", describes the administrative state of the unit represented by the agent/subagent with the possible values of locked, unlocked, and shuttingDown. A "subagent" refers to an agent under the control of another agent. The unit refers to some sort of a component, or all of the resource, i.e., the entity being managed through the agent. For example, a unit may be a personal computer (PC), a board within a PC, and so forth. The state values and state transitions are as defined in the ITU-T X.731 standard. The administrative state can be set by the manager and used to administratively prohibit the agent from use. In conjunction with the community string, the administrative state can be used for concurrency control.

The operational state 415, which is designated by the object "unitOperationalState", describes the operational state of the unit represented by the agent/subagent, with the possible values of "enabled" or "disabled". Management can not request the change of the operational state, but can designate pre-conditions for allowing an agent to determine whether it, or any of its components, or any resource represented by the agent is enabled or disable. It is the natural operation of the resource that causes operational state transitions to occur, e.g., after a network element completes a number of self-tests and all of its rudimentary tasks are initialized and running it can set its operational status from disabled to enabled. However, the management station can provide information to an agent which indirectly changes the agent's operational status. The state values and state transitions are as defined in the ITU-T X.731 standard.

The usage state 420, which is designated by the object "unitUsageState", describes the usage state of the unit represented by the agent/subagent with the possible values of idle, active, or busy. Management can not request the change of the usage state. It is the natural operation of the resource that causes operational state transitions to occur The state values and state transitions are as defined in the ITU-T X.731 standard.

The procedural status 425, which is designated by the object "unitProceduralStatus", describes the procedural status of the unit represented by the agent/subagent with the possible values of initializationRequired, notInitialized, initializing, reporting, terminating, and ready. The value defined for the procedural status in the X.731 standard is a set of enumerated values. Modeling a set value with SNMP object types would include a number of additional steps in the management of that value, i.e. either special encoding or a more complex data structure would be required. Therefore, true to the principle of "simple management", a procedural status in accordance with the present invention is restricted to one of the enumerated sets with the addition of the value "ready" which corresponds to the empty set. This type of definition maps cleanly into the X.731 standard while not impairing the SNMP management paradigm. The procedural status can be set by the manager.

The alarm status 430, which is designated by the object "unitAlarmStatus", describe's the alarm status. of the unit represented by the agent/subagent with the possible values; of underRepair, critical, major, minor, alarmOutstanding, and idle. The value defined for the alarm status in the X.731 standard is a set of enumerated values. Similar to the solution for the; procedural status, the alarm status in accordance with the present invention is restricted to one of the enumerated set with the addition of the value "idle" which corresponds to the empty set. The alarm status can be set by the manager.

The availability status 435, which is designated by the object "unitAvailabilityStatus", describes-the availability status of the unit represented by the agent/subagent with the possible values of inTest, failed, poweroff, offLine, offDuty, dependency, degraded, notinstalled, logFull, and available. The value defined for the availability status in the X.731 standard is a set of enumerated values. Similar to the solution for the procedural status, the availability status is restricted to one of the enumerated sets, with the addition of the value "available" which corresponds to the empty set. Management cannot request the change of the availability status.

The control status, which is designated by the object "ControlStatus", describes the control status of the unit represented by the agent/subagent with the possible values of subjectToTest, partLocked, reservedToTest, suspended, and free. The value defined for the control status in the X.731 standard is a set of enumerated values. Similar to the solution for the procedural status, the control status is restricted to one of the enumerated sets, with the addition of the value "free" which corresponds to the empty set. The control status can be set by the manager.

The standby status 445, which is designated by the object "unitStandbyStatus", describes the standby status of the unit represented by the agent/subagent with the possible values of hotStandby, coldStandby, and providingService. Management can not request the change of the standby status. It is the natural operation of the resource that causes standby status transitions to occur. The status values and status transitions are as defined in the ITU-T X.731 standard.

The unknown status, which is designated by the object "unitUnknownStatus", describes the unknown status of the unit represented by the agent/subagent with the possible values of true and false. Management can not request the change of the unknown status. It is the natural operation of the resource that causes unknown status transitions to occur. The status values and status transitions are as defined in the ITU-T X.731 standard.

Figure 5:
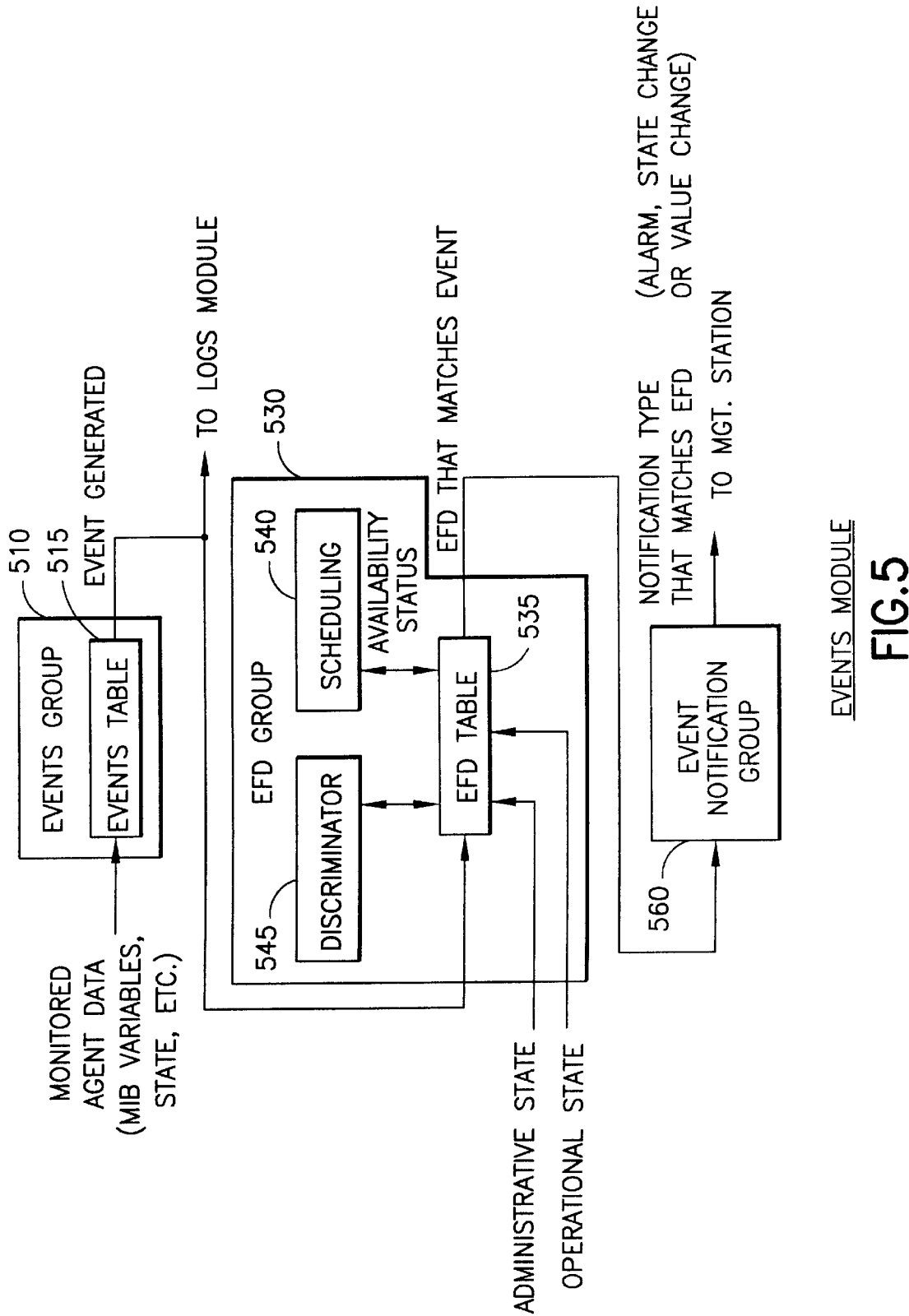
FIG. 5 illustrates an events module in accordance with the present invention.

FIG. 5 illustrates an events module in accordance with the present invention. The events module enables managers to configure the types of events that can be generated by an agent, and when those events should be transformed into asynchronous notifications (SNMP Traps) to be sent to different managers. The mechanism and information model used correspond to the TMN X.733 and X.734 standards defining event management and alarm reporting.

The events module defines the following object groups: Events group 510, Event Forwarding Discriminator (EFD) Group 530, and Event Notifications. The Events Group 510 comprises event configuration information defining the types of events that the agent shall generate, and the preconditions (i.e., conditions which must be met) for generating the events.

The Event Forwarding Discriminator (EFD) Group 530 comprises EFD configuration information defining what types of events an EFD will transform into notifications, at what times of day it will do so, and to which managers it will send the notifications to. Thus, only some events may result in a notification being sent from the agent to the management station.

The Event Notifications group 560 defines three types of notifications which an agent can send to a manger. These are an alarm notification, a state change notification, and a value change notification. Each EFD specifies what type of notification is to be sent for an event that has occurred in the agent. The EFD also specifies the conditions (e.g., preconditions) under which such a notification is to be sent and the IP address of the manager to which the notification is to be sent. All standard SNMP traps are sent to the managers UDP port 162. All management platforms, including HP OpenView™, Sun DomainManager™, etc. support this mechanism.

The Events Group 510 stores event descriptions in a table 515. Each row in the table 515 corresponds to an event that the agent is to generate. The event description in table 515 specifies the conditions under which the agent is to generate the event, for example, when a MIB variable has crossed a specified threshold, when a state has been changed, and so forth.

Once the agent generates an event as specified in the Event table 515, it checks an EFD Table 535 to find an EFD that matches that event and specifies what kind of notification is to be generated, and to which manager that notification is to be sent. The match is performed based on event characteristics such as event type, and so forth, which may be defined by event information that is communicated from the management station to the agent.

The EFDs in the EFD Table 535 are controlled by three state/status variables, namely the administrative state, the operational state, and the availability status. If the administrative state is not unlocked, or the operational state is not enabled, or the availability status is not available, the EFD is inactive. In this case, the EFD is ignored by the agent. The manager sets the administrative state of the events module, while the operational state is determined at the agent. The availability status is set as a result of an automatic scheduling function 540 that is also associated with the EFD and specified in the EFD table. The scheduling function 540 includes specifications of a daily start and stop time and a weekly mask specifying when the EFD changes availability status from off-duty to available. The mask is the value of a bit string which provides the change in EFD availability status or other designated information. Exemplary masks are defined in the Appendix under "EventType".

The EFD group 530 also includes a discriminator construct 545 which specifies the characteristics an event must have in order to be selected for forwarding to the event notification group 560. These characteristics may be defined by EFD information which is part of the event information communicated from the management station to the agent.

Figure 6:
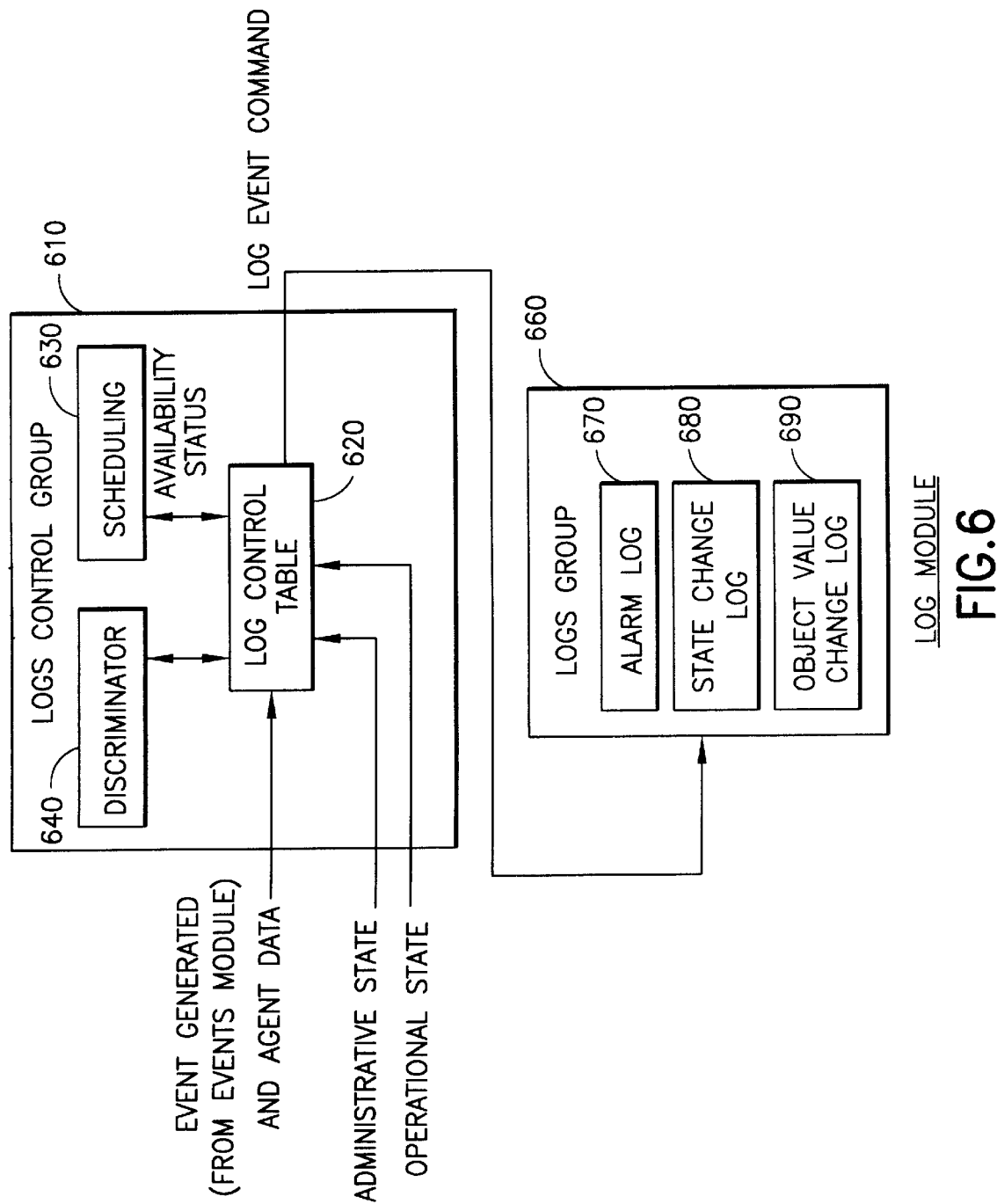
FIG. 6 illustrates a logs module in accordance with the present invention.

FIG. 6 illustrates a logs module in accordance with the present invention. The logs module includes a log control group 610, which includes a log control table 620, a scheduling construct 630, and a discriminator construct 640. The logs module also includes a logs group 660, which includes an alarm log 670, a state change log 680, and an object value change log 690.

The logs module enables managers to configure the types of logs that can be generated by an agent. The mechanism and information model used are based on the ITU-T TMN X.735 Log Model. The logs module, in addition to conceptually storing the logged information, determines which information is to be logged. Each log control group 610 includes a discriminator construct 640 which specifies the characteristics an event must have in order to be selected for entry in a log.

The Log Control Group 610 defines the types of logs tables 620 the agent is maintaining, their discriminators, the log scheduling, and so forth. The Logs group 660 defines three logs, namely the alarm log 670, the state change log 680, and the object value change log 690.

Logs are controlled by the Log Control Table 620 as specified in the ITU-T TMN X.735. Each entry in that table associates events with logs and specifies when the event is to be entered in a log. An event is logged if the log discriminator 640 holds. That is, the event is logged, e.g., if is of a certain type, if it has been generated by a certain object, if it exceeds a certain threshold, and so forth. The log control entries themselves are controlled by state/status variables, namely, the administrative state, the operational state, and the availability status. The manager sets the administrative state of the log module, while the operational state is determined at the agent. The on an automatic log control scheduling mechanism 630 which specifies the times during which the logs are to be made.

Entries in the Log Control Table 620 also specify log control information and log statistics.

The three logs 670, 680, 690 defined are defined as tables in which each event is stored as a row. The logs in the alarm log table 670 are logs of alarm event that have passed the log control discriminator 640 in the Log Control Table 620. Similarly the logs in the state change log table 680 are logs of state changes. Additionally, logs in the object value change table 690 are logs of object value changes.

Information stored in the logs group is stored first at the agents, then read from time to time by the management station.

As can be seen, the present invention provides an enchanced SNMP management system for telecommunications networks which efficiently provides many of the sophisticated management techniques enabled by OSI, CMIP and TMN, while maintaining the simplicity of SNMP. The enhanced SNMP defines a management state of each SNMP agent, define events which are to be reported from the agent to the management station, and provides a log for recording particular events and associated agent data vales when the events occur. The enhanced SNMP also provides the capability for an alarm, state change, and value change notification to be communicated from the SNMP agents to an SNMP management station when specific events occur at the agent.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for providing an enhanced Simple Network Management Protocol (SNMP) for use by an SNMP management station in managing at least one SNMP agent, comprising the steps of:

defining event information at the SNMP management station, and communicating the event information to the at least one SNMP agent via a network;

storing the event information at the SNMP agent;

said event information defining pre-conditions for generating an event;

monitoring data associated with the SNMP agent to determine if the pre-conditions have been met, and, if so, generating the event at the agent; and communicating a notification regarding the event from the SNMP agent to the SNMP management station via the network;

wherein said notification comprises at least one of X.700 style alarm notification, X.700 style event surveillance, and X.700 style event reporting.

2. The method of claim 1, wherein:

said event information defines said available notification types.

3. The method of claim 1, comprising the further step of:

defining state information at the management. station according to said notification that is communicated thereto from the agent;

wherein the state information is adapted for use in managing the agent.

4. The method of claim 1, comprising the further steps of:

defining administrative state information at the management station designating whether the agent, any of its components, or any resource represented by the agent has a locked or unlocked status;

communicating the administrative state information to the agent via the network; and monitoring the locked or unlocked status at the agent to determine a change in the state of the agent, any of its components, or any resource represented by the agent.

5. The method of claim 1, comprising the further steps of:

defining operational state information at the management station designating whether the agent, any of its components, or any resource represented by the agent has an enabled or disabled status;

communicating the operational state information to the agent via the network; and monitoring the enabled or disabled status at the agent to determine a change in the state of the agent, any of its components, or any resource represented by the agent.

6. The method of claim 1, comprising the further steps of: defining operational state information at the agent, any of its components, or any resource represented by the agent which designates an enabled or disabled status thereof; and monitoring the enabled or disabled status at the agent to determine a change in the state of the agent, any of its components, or any resource represented by the agent.

7. The method of claim 1, comprising the further steps of:

defining availability status information at the agent designating whether or not the agent, any of its components, or any resource represented by the agent is available; and monitoring the availability status information at the agent to determine a change in the state of the agent, any of its components, or any resource represented by the agent.

8. The method of claim 1, wherein said event information defines information regarding event forwarding discriminator (EFD) information that defines EFD pre-conditions for said notification communicating step, comprising the further steps of:

monitoring events that are generated by the agent to determine if the EFD pre-conditions have been met, and, if so, communicating said notification regarding the event from the agent to the management station via the network.

9. The method of claim 8, wherein:

said EFD information defines a schedule for communicating said notification regarding the event from the agent to the management station via the network.

10. The method of claim 8, wherein:

said network is associated with a plurality of SNMP management stations; and said EFD information defines particular ones of said plurality of SNMP management stations that are to receive said notification regarding the event.

11. The method of claim 8, comprising the further steps of:

defining administrative state information at the management station designating whether the EFD has a locked or unlocked status, and communicating the administrative state information to the agent via the network; and monitoring the locked or unlocked status at the agent to determine if the EFD pre-conditions have been met.

12. The method of claim 8, comprising the further steps of:
   defining operational state information of the EFD which designates an enabled or disabled status thereof; and
   monitoring the enabled or disabled status at the agent to determine if the EFD pre-conditions have been met.

13. The method of claim 8, comprising the further steps of:
   defining availability status information designating whether or not the EFD is available; and
   monitoring the availability status information at the agent to determine if the EFD pre-conditions have been met.

14. The method of claim 8, comprising the further steps of:
   defining operational state information at the management station designating whether the EFD has an enabled or disabled status;
   communicating the operational state information to the agent via the network; and
   monitoring the enabled or disabled status at the agent to determine if the EFD pre-conditions have been met.

15. The method of claim 1, comprising the further steps of:
   defining log information at the management station;
   communicating the log information to the agent via the network;
   storing the log information at the agent;
   said log information defining log pre-conditions for creating a log entry for the generated event; and
   monitoring data associated with the agent to determine if the log pre-conditions have been met, and, if so, creating the log entry for the generated event at the agent.

16. The method of claim 15, comprising the further step of:
   creating particular logs for the generated event according to the corresponding notification type to provide at least one of an alarm log entry, a state change log entry, and a value change log entry.

17. The method of claim 15, comprising the further step of:
   reading the log entry for the generated event to obtain said notification that is communicated from the agent to the management station.

18. The method of claim 15, wherein said log information defines log discriminator (LD) information that defines LD pre-conditions for creating the log entry for the generated event at the agent, comprising the further steps of:
   monitoring events that are generated by the agent to determine if the LD pre-conditions have been met, and, if so, creating the log entry for the generated event at the agent.

19. The method of claim 18, comprising the further steps of:
   defining administrative state information at the management station designating whether the LD has a locked or unlocked status;
   communicating the administrative state information to the agent via the network; and m
   monitoring the locked or unlocked status at the agent to determine if the log pre-conditions have been met.

20. The method of claim 18, comprising the further steps of:
   defining operational state information which designates an enabled or disabled status of the LD; and
   monitoring the enabled or disabled status at the agent to determine if the log pre-conditions have been met.

21. The method of claim 18, comprising the further steps of:
   defining availability status information at the agent designating whether or not the LD is available; and
   monitoring the availability status information at the agent to determine if the log pre-conditions have been met.

22. The method of claim 18, wherein:
   said LD information defines a schedule for creating the log entry for the generated event at the agent.

23. An apparatus for providing an enhanced Simple Network Management Protocol (SNMP). for use by an SNMP management station in managing at least one SNMP agent, comprising:
   defining means for defining event information at the SNMP management station;
   first communication means for communicating the event information to the SNMP agent via a network;
   a memory associated with the agent for storing the event information communicated thereto;
   said event information defining pre-conditions for generating an event;
   monitoring means associated with the SNMP agent for monitoring data associated therewith to determine if the pre-conditions have been met, and, if so, generating the event at the agent; and
   second communication means associated with the SNMP agent for communicating a notification regarding the event to the SNMP management station via the network;
   wherein said notification comprises at least one of X.700 style alarm notification, X.700 style event surveillance, and X.700 style event reporting.

24. The apparatus of clam 23, wherein:
   said event information defines said available notification types.

25. The apparatus of claim 23, wherein:
   said defining means defines state information at the management station according to said notification that is communicated thereto from the agent; and
   the state information is adapted for use in managing the agent.

26. The apparatus of claim 23, wherein:
   said defining means defines administrative state information at the management station designating whether the agent, any of its components, or any resource represented by the agent has a locked or unlocked status;
   said first communication means communicates the administrative state information to the agent via the network; and
   said monitoring means monitors the locked or unlocked status at the agent to determine a change in the state of the agent, any of its components, or any resource represented by the agent.

27. The apparatus of claim 23, wherein:
   said defining means defines operational state information at the management station designating whether the agent, any of its components, or any resource represented by the agent has an enabled or disabled status,
   said first communication means communicates the operational state information to the agent via the network; and
   said monitoring means monitors the enabled or disabled status at the agent to determine a change in the state of the agent, any of its components, or any resource represented by the agent.

28. The apparatus of claim 23, further comprising:

means for defining operational state information at the agent, any of its components, or any resource represented by the agent which designates an enabled or disabled status thereof; wherein:

said monitoring means monitors the enabled or disabled status at the agent to determine a change in the state of the agent, any of its components, or any resource represented by the agent.

29. The apparatus of claim 23, further comprising:

means for defining availability status information at the agent designating whether or not the agent, any of its components, or any resource represented by the agent is available; wherein:

said monitoring means monitors the availability status information at the agent to determine a change in the state of the agent, any of its components, or any resource represented by the agent.

30. The apparatus of claim 23, wherein:

said event information defines event forwarding discriminator (EFD) information that defines EFD pre-conditions for said second communications means to communicate said notification; and said monitoring means monitors events that are generated by the agent to determine if the EFD pre-conditions have been met, and, if so, communicating said notification regarding the event from the agent to the management station via the network.

31. The apparatus of claim 30, wherein:

said EFD information defines a schedule for said second communications means to communicate said notification.

32. The apparatus of claim 30, wherein:

said network is associated with a plurality of SNMP management stations; and said EFD information defines particular ones of said plurality of SNMP management stations that are to receive said notification regarding the event.

33. The apparatus of claim 30, wherein:

said defining means defines administrative state information at the management station designating whether the EFD has a locked or unlocked status;

said first communication means communicates the administrative state information to the agent via the network; and said monitoring means monitors the locked or unlocked status at the agent to determine if the EFD pre-conditions have been met.

34. The apparatus of claim 30, further comprising:

means for defining operational state information of the EFD which designates an enabled or disabled status thereof; wherein:

said monitoring means monitors the enabled or disabled status at the agent to determine if the EFD pre-conditions have been met.

35. The apparatus of claim 30, further comprising:

means for defining availability status information designating whether or not the EFD is available; wherein:

said monitoring means monitors the availability status information at the agent to determine if the EFD pre-conditions have been met.

36. The apparatus of claim 30, wherein:

said defining means defines operational state information at the management station designating whether the EFD has an enabled or disabled status;

said first communication means communicates the operational state information to the agent via the network; and said monitoring means monitors the enabled or disabled status at the agent to determine if the EFD pre-conditions have been met.

37. The apparatus of claim 23, wherein:

said defining means defines log information at the management station;

said first communication means communicates the log information to the agent via the network;

said memory stores the log information at the agent;

said log information defines log pre-conditions for creating a log entry for the generated event; and said monitoring means monitors data associated with the agent to determine if the log pre-conditions have been met, and, if so, creates the log entry for the generated event at the agent.

38. The apparatus of claim 37, wherein the agent comprises:

means for creating particular logs for the generated event according to the corresponding notification type to provide at least one of an alarm log entry, a state change log entry, and a value change log entry.

39. The apparatus of claim 37, further comprising:

means for reading the log entry for the generated event to obtain said notification that is communicated from the agent to the management station.

40. The apparatus of claim 37, wherein:

said log information defines log discriminator (LD) information that defines LD pre-conditions for creating the log entry for the generated event at the agent; and said monitoring means monitors events that are generated by the agent to determine if the LD pre-conditions have been met, and, if so, creating the log entry for the generated event at the agent.

41. The apparatus of claim 40, wherein:

said defining means defines administrative state information at the management station designating whether the LD has a locked or unlocked status;

said first communication means communicates the administrative state information to the agent via the network; and said monitoring means monitors the locked or unlocked status at the agent to determine if the log pre-conditions have been met.

42. The apparatus of claim 40, further comprising:

means for defining operational state information which designates an enabled or disabled status of the LD; wherein:

said monitoring means monitors the enabled or disabled status at the agent to determine if the log pre-conditions have been met.

43. The apparatus of claim 40, further comprising:

means for defining availability status information at the agent designating whether or not the LD is available; wherein:

said monitoring means monitors the availability status information at the agent to determine if the log pre-conditions have been met.

44. The apparatus of claim 40, wherein:

said LD information defines a schedule for creating the log entry for the generated event at the agent.

45. The method of claim 1, wherein said notification further includes an alarm notification indicative of an alarm condition at the agent, said alarm notification having attributes indicative of a name, type, and probable cause of the event giving rise to the alarm condition.

46. The method of claim 45, wherein said attributes of the alarm notification are further indicative of at least one of a specific problem, a perceived severity, a trend indication, and a text description relating to said alarm condition.

47. The method of claim 45, wherein said attributes of the alarm notification are further indicative of a specific problem, a perceived severity, a trend indication, and a text description relating to said alarm condition.

48. The method of claim 45, wherein said notification further comprises a state change notification indicative of a change of a state of the agent, said state change notification having attributes indicative of a name of the event, a state change, and identity of said object.

49. The method of claim 1, wherein said notification further comprises a state change notification indicative of a change of a state of the agent, said state change notification having attributes indicative of a name of the event, a state change, and identity of said object.

50. The apparatus of claim 23, wherein said notification further designates an alarm notification indicative of an alarm condition at the agent, said alarm notification having attributes indicative of a name, type, and probable cause of the event giving rise to the alarm condition.

51. The apparatus of claim 50, wherein said attributes of the alarm notification are further indicative of at least one of a specific problem, a perceived severity, a trend indication, and a text description relating to said alarm condition.

52. The apparatus of claim 50, wherein said attributes of the alarm notification are further indicative of a specific problem, a perceived severity, a trend indication, and a text description relating to said alarm condition.

53. The apparatus of claim 50, wherein said notification further comprises a state change notification indicative of a change of a state of the agent, said state change notification having attributes indicative of a name of the event, a state change, and identity of said object.

54. The apparatus of claim 23, wherein said notification further comprises a state change notification indicative of a change of a state of the agent, said state change notification having attributes indicative of a name of the event, a state change, and identity of said object.

55. The method of claim 1, wherein said notification includes a value change notification indicative of a change in a value of an object associated with the agent, said value change notification having attributes indicative of a name of the event and identity of said object.

56. The apparatus of claim 23, wherein said notification includes a value change notification indicative of a change in a value of an object associated with the agent, said value change notification having attributes indicative of a name of the event and identity of said object.

57. A method for providing an enhanced Simple Network Management Protocol (SNMP) for use by an SNMP management station in managing at least one SNMP agent, comprising the steps of:

defining event information at the SNMP management station, and communicating the event information to the at least one SNMP agent via a network;

storing the event information at the SNMP agent;

said event information defining pre-conditions for generating an event;

monitoring data associated with the SNMP agent to determine if the pre-conditions have been met, and, if so, generating the event at the agent; and communicating a notification regarding the event from the SNMP agent to the SNMP management station via the network;

wherein said notification is enabled by mapping an X.700 style information model onto an SNMP information model.

58. The method of claim 57, wherein said notification comprises at least one of X.700 style alarm notification, X.700 style event surveillance, and X.700 style event reporting.

59. An apparatus for providing an enhanced Simple Network Management Protocol (SNMP) for use by an SNMP management station in managing at least one SNMP agent, comprising:

defining means for defining event information at the SNMP management station;

first communication means for communicating the event information to the SNMP agent via a network;

a memory associated with the agent for storing the event information communicated thereto;

said event information defining pre-conditions for generating an event;

monitoring means associated with the SNMP agent for monitoring data associated therewith to determine if the pre-conditions have been met, and, if so, generating the event at the agent; and second communication means associated with the SNMP agent for communicating a notification regarding the event to the SNMP management station via the network;

wherein said notification is enabled by mapping an X.700 style information model onto an SNMP information model.

60. The apparatus of claim 59, wherein said notification comprises at least one of X.700 style alarm notification, X.700 style event surveillance, and X.700 style event reporting.

* * * * *